(12) United States Patent
Smerecxniak

(10) Patent No.: US 7,641,153 B2
(45) Date of Patent: Jan. 5, 2010

(54) DIRECTED ENERGY OFF-BODY HEATING FOR SUPERSONIC VEHICLE SHOCKWAVE AND SONIC BOOM CONTROL

(75) Inventor: Philip Smerecxniak, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 492 days.

(21) Appl. No.: 11/284,337

(22) Filed: Nov. 21, 2005

(65) Prior Publication Data
US 2007/0114322 A1    May 24, 2007

(51) Int. Cl.
*B64C 23/00* (2006.01)
(52) U.S. Cl. .................. 244/205; 244/35 A
(58) Field of Classification Search .............. 244/1 N, 244/205, 35 A, 171.7
See application file for complete search history.

(56) References Cited

U.S. PATENT DOCUMENTS

| 5,471,220 | A | 11/1995 | Hammers et al. | |
| 6,527,221 | B1 * | 3/2003 | Kremeyer | 244/1 N |
| 6,534,705 | B2 * | 3/2003 | Berrios et al. | 136/243 |
| 2005/0061908 | A1 * | 3/2005 | Kremeyer | 244/1 N |

OTHER PUBLICATIONS

U.S. Appl. No. 10/350,544, filed Jul. 29, 2004, Rice et al.
Batdorf, S.B., *Alleviation of the Sonic Boom by Thermal Means*, J. Aircraft, Jan. 1972, pp. 150-156, vol. 9, No. 2.
Crow, Steven C. and Bergmeier, Gene G., *Active Sonic Boom Control*, J. Fluid Mech., 1996, pp. 1-28, vol. 325.
Miles, Richard B. et al., *Suppression of Sonic Boom by Dynamic Off-Body Energy Addition and Shape Optimization*, 40th AIAA Aerospace Meeting & Exhibit, AIAA, pp. 1-13, AIAA-2002-0150.
Miller, David S. and Carlson, Harry W., *Application of Heat and Force Fields to Sonic-Boom Minimization*, J Aircraft, Aug. 1971, pp. 657-662, vol. 8, No. 8.
Swigart, Rudolph J., *Verification of the Heat-Field Concept for Sonic-Boom Alleviation*, J. Aircraft, Feb. 1975, pp. 66-71, vol. 12, No. 2.
http://www.csa.com/partners/viewrecord.php?requester=gs&collection=TRD&recid=2001, Mar. 28, 2006, Marconi, Frank, *An Investigation of Tailored Upstream Heating for Sonic Boom and Drag Reduction*, AIAA, Aerospace Sciences Meeting & Exhibit, 36th, Reno, NV, Jan. 12-15, 1998.

* cited by examiner

*Primary Examiner*—Michael R Mansen
*Assistant Examiner*—Michael Kreiner
(74) *Attorney, Agent, or Firm*—Harness, Dickey & Pierce, P.L.C.

(57) ABSTRACT

Methods and apparatus for suppressing noise. The present invention provides a method that includes directing a laser at a first volume of gas and directing microwave radiation to a second volume. The method includes selecting the location of the second volume so that it is overrun by a shockwave system of a supersonic vehicle. Preferably, the directing of the radiation is from a vehicle that flies at high altitude and is of practical length (e.g., 100-400 feet or more). The radiation may be pulsed and steered. The present invention also provides a system including a laser and microwave antenna for controlling the noise of a supersonic vehicle. The laser is directed at a first volume while the antenna is pointed at a second volume that envelops the first volume. The location of the second volume is such that it will be overrun by the shockwave system of the vehicle.

9 Claims, 5 Drawing Sheets

Energy Deposition Analysis Results

DIRECTED ENERGY OFF-BODY HEATING FOR SUPERSONIC VEHICLE SHOCKWAVE AND SONIC BOOM CONTROL

FIELD OF THE INVENTION

This invention relates generally to sonic boom control and, more particularly, to sonic boom control using energy directed to the far field of the vehicle.

BACKGROUND OF THE INVENTION

The motion of a vehicle through the atmosphere at high supersonic speeds (particularly at Mach numbers greater than 1.4) produces shockwaves from the vehicle fore-body, lifting surfaces, propulsion systems, tail structures and other elements. These shockwaves coalesce far below the vehicle and before they reach the ground and form overpressure regions associated with the phenomenon referred to as a sonic boom. These shockwaves and sonic booms create noise conditions on the ground that are unacceptable to the general public and prohibited by FAA regulations. As a result, it has proven to be impractical to create large commercial supersonic transports, such as that envisioned by the NASA High Speed Civil Transport (HSCT) program that can operate over inhabited areas. For instance, the European Concorde, which operated at supersonic speeds, was limited to only over water operation, and was restricted to only selected airports while it was in service because of the noise associated with its flight. Such limitations make it financially impractical to create the next generation of supersonic transports.

Sonic booms are created by supersonic vehicles as they push the oncoming air out of their path. It is a natural effect of supersonic flight. Previous methods of controlling sonic booms have been proposed, but none have offered sufficient promise to enable vehicle development to proceed. For example, vehicle concepts have been proposed in which their shape and lift distribution have been modified along with reducing the vehicle weight to partially limit the ground noise created from supersonic flight. Other methods have been proposed that incorporate structures (such as rings) around the fuselage to reflect the shockwaves from sections of the vehicle thereby preventing the shockwaves from propagating to the ground. These structural changes significantly increase the length of the vehicles, produce inefficient volumes for passengers and cargo, and alter their lift and flight stability and control systems in ways that so far have proven to be incompatible with cost effective design and operation of the vehicles. Other concepts have been proposed which use energy methods involving plasma processes on the surface or very near the vehicle. These concepts are ineffective because they do not impact the far field noise generating processes of the sonic boom.

SUMMARY OF THE INVENTION

It is in view of the above problems that the present invention was developed. The invention provides methods and apparatus for suppressing noise and sonic booms from supersonic vehicles. Accordingly, the present invention enables the development of small or large, commercially viable, supersonic transport aircraft. Even the focused sonic booms produced by lower Mach number supersonic aircraft during maneuvering can be suppressed in accordance with the principles of the present invention. Furthermore, in preferred embodiments of the present invention the wave drag associated with supersonic vehicles is reduced thereby yielding fuel and operating costs savings. Further still, the present invention allows utilization of current aerodynamic and structural design methods without resorting to extreme shape changes leading to improved overall vehicle design flexibility.

The directed energy, off-body-heating method provided by a first preferred embodiment of the present invention produces a heated region, preferably, ahead of and below the vehicle at a location determined based upon the specific vehicle, altitude and Mach number. The heated region interacts with the shockwaves of the vehicle. The interaction can be produced periodically or continuously to produce changes in the overpressure structure far below on the ground that reduce the intensity of the sonic boom to acceptable levels. More particularly, a laser is used to breakdown, and ionize, a smaller region of air within the region to be heated. The laser breakdown thus creates a volume filled with ions and electrons. A microwave antenna focuses microwave energy into the overall region where the energy is readily absorbed by the electrons which then collisionally produce far more electrons and an air plasma that raises the temperature of the air in the overall volume to the desired level. In effect, the laser ionized area can be likened to an initiating spark that creates a small, electrically conductive spot in the overall region and allows the microwave energy to efficiently couple into the air in the overall region. Further, the method of the current embodiment produces effects in the far-field that affect the sonic boom without requiring the extreme structural modifications to the aircraft as previous approaches have required. Thus, the present invention makes it financially practical to design, construct, and operate supersonic commercial aircraft.

The present invention also provides, in another preferred embodiment, a vehicle subsystem that includes one or more microwave antennas based on an electronically scanned array and a steerable laser. The subsystem includes a control circuit(s) to steer, and focus, the laser and the microwave antenna energy to the region to be heated. For example, for a vehicle traveling nominally at an altitude of 60,000 feet and Mach 2.5 like the concepts in NASA's High Speed Civil Transport program and DARPA's Quiet Supersonic Platform (QSP) program, the subsystem preferably focuses the laser and microwave energy at a distance of about 1 to 2 vehicle body lengths forward and below the aircraft. Shockwaves form around the heated spot that are overrun by and interact with the shock system of the vehicle thereby disrupting far field shock coalescence and shock wave structure thereby suppressing the formation of sonic booms.

In another preferred embodiment, the present invention provides a method that includes directing a laser at a first volume of air and directing microwave radiation to a second larger, enveloping volume of air producing a heated region of air within an expanding shockwave structure. The method also includes selecting the location of the volume of heated air so that it drifts into a shockwave. Preferably, the method includes allowing the volume of heated air to actually drift into the aircraft shockwave system. The directing of the radiation may be from a vehicle that flies at any altitude over land. Furthermore, the method may include pulsing and steering the radiation.

In yet another preferred embodiment, the present invention provides a system for controlling the noise of a supersonic vehicle that includes a laser and a microwave antenna system. The laser is focused at a first volume while the antenna is pointed at a second larger volume that envelops the first volume. The location of the first volume is selected so that it will drift into the shockwave system of the supersonic vehicle. Further, the system may include a microwave system that can generate the microwave radiation periodically. Likewise, the laser can also be periodic. Preferably, the laser and microwave radiation are directed to the first and second volumes simultaneously. Also, preferably, the microwave system is an electronically steerable array (ESA).

In still another preferred embodiment, the present invention provides a vehicle that includes a supersonic airframe and a sonic boom noise suppression subsystem. The noise suppression subsystem includes a laser, a microwave transmitter, and a microwave antenna system in communication with the transmitter. The laser and the microwave antenna direct radiation to, respectively, a first volume of air and a second volume of air that is larger than and envelops the first volume of air. The larger volume of heated air is at a location that allows it to be overrun by the shockwave system of the supersonic vehicle. Preferably, the supersonic vehicle can fly at high altitudes (e.g., 60,000 feet) and is of typical length (e.g., 100-400 feet) with the first volume of air being about 1-2 body lengths from the vehicle. Also, the airframe can be partially adapted to suppress the formation of sonic booms, although it need not be so adapted.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate exemplary embodiments of the present invention and together with the description, serve to explain the principles of the invention. In the drawings.

DETAILED DESCRIPTION OF THE PREFERRED EMBODIMENTS

Figure 1:
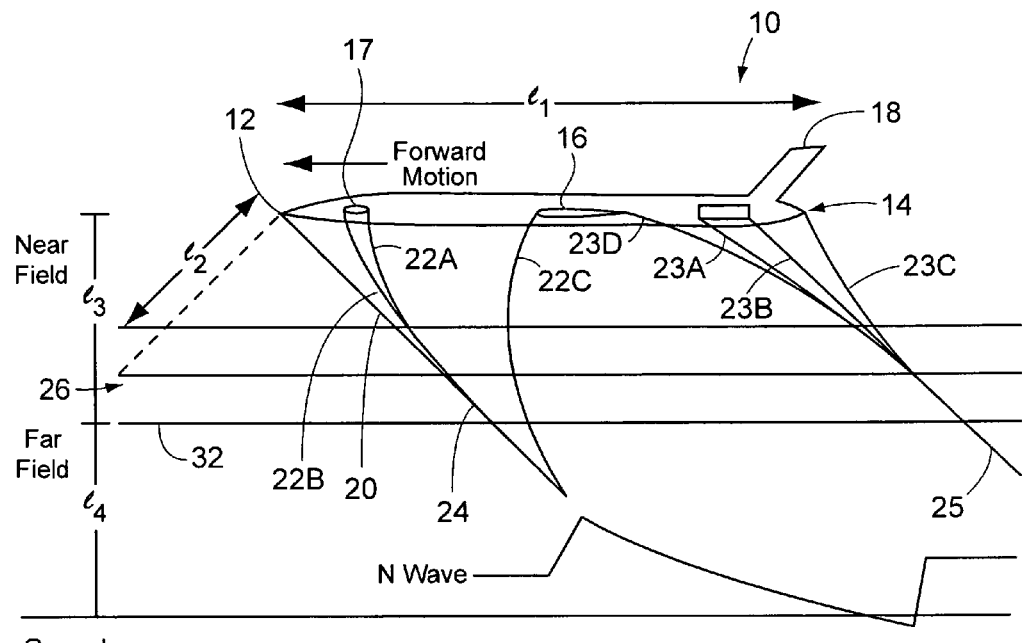
FIG. 1 illustrates a supersonic vehicle constructed in accordance with a preferred embodiment of the present invention.

Referring to the accompanying drawings in which like reference numbers indicate like elements, FIG. 1 illustrates a supersonic vehicle traveling through an atmosphere. The vehicle 10 includes an airframe composed of various major sub-assemblies such as a nose 12, a tail cone 14, wings 16, a canard wing 17, a tail 18, and an engine 19. Each portion of the vehicle can create shock waves as the vehicle 10 moves through the atmosphere at supersonic speeds of which several exemplary shock waves are illustrated. The shock wave 20 is caused by the nose 12 pushing air out of its way. Similarly, shock waves 22A and 22B are shown arising from the canard wing 17 aft of the nose 12 of the vehicle 10. In the flow field far below the vehicle (greater than about 10 aircraft lengths from the aircraft 10 and hereinafter the "far field") the various shockwaves 20, 22A, 22B, and 22C generally propagate from the vehicle 10 at or near their original mach angles and therefore remain spaced apart from one and other near the vehicle. However, it is known that as the shockwaves 20, 22A 22B and 22C propagate, they coalesce into a leading shock wave 24 in the far field which eventually reaches the ground. Similarly, as shown, shockwaves 23A, 23B, and 23C coalesce into a trailing shockwave 25.

Figure 2:
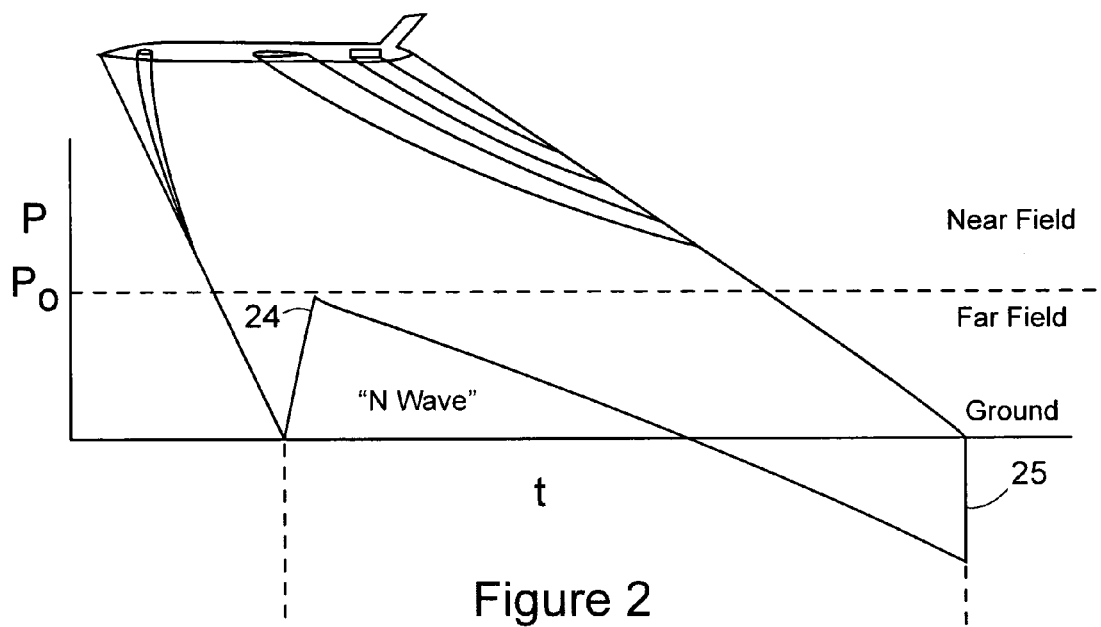
FIG. 2 illustrates an overpressure condition associated with a sonic boom.

FIG. 2 shows that the result of the coalescence of the shockwaves is an "N Wave" that is experienced at ground level by observers of the vehicle 10. The term "N Wave" describes the over pressure experienced at a point subject to the sonic boom of the vehicle 10. Initially, the leading shock wave 24 reaches the observer and produces a pressure spike. The leading wave 24, by the time it has reached the ground, is the result of the coalescence of the shockwaves 20, 22A, 22B, and 22C. It produces a sharp, sudden spike of pressure above the ambient condition as it passes over an observer on the ground and the associated noise can be quite high. The over pressure subsides as the leading wave 24 moves along in the direction of flight thereby creating a steady decrease in pressure which is represented by the downwards sloping diagonal cross member of the "N." As the disturbance moves across the observer, the over pressure condition changes to an under pressure condition that is suddenly corrected when the trailing wave 25 arrives and returns the pressure to ambient. At this time, the sonic boom has moved beyond the observer.

Figure 3:
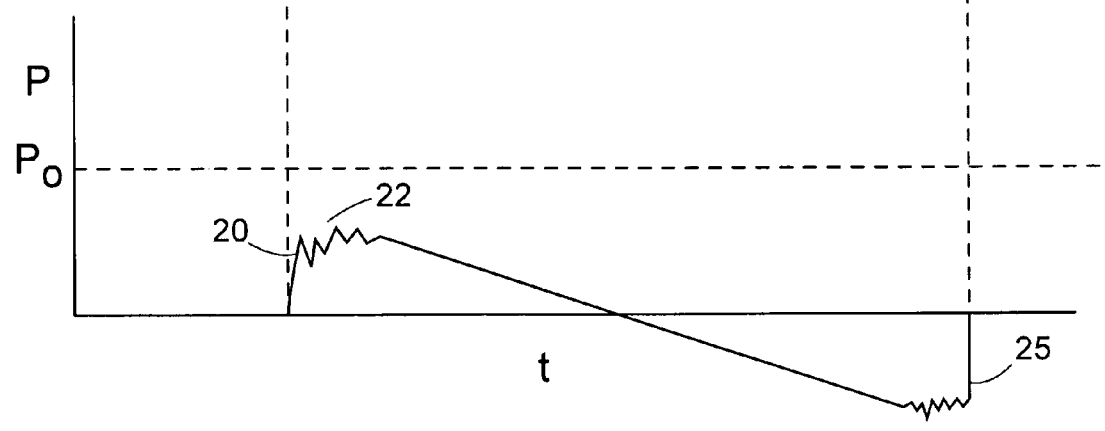
FIG. 3 illustrates an overpressure condition formed in accordance with the principles of the present invention.

If the coalescence of the shock waves 20, 22A, 22B, and 22C could be delayed (or prevented altogether), the result will be a significantly lower peak over pressure condition on the ground. FIG. 3 illustrates this point. With the shock waves 20, 22A, 22B, and 22C arriving on the ground at different times, the peak over pressure amplitude will be reduced and spread out over time. Accordingly, the loud initial "boom" of the sonic boom will be lower and better tolerated by those experiencing it. Thus, in accordance with the principles of the present invention, the coalescence of the shockwaves 20, 22A, 22B, and 22C (or any group of two or more shock waves propagating from different portions of the vehicle 10) is delayed or prevented altogether.

Figure 4:
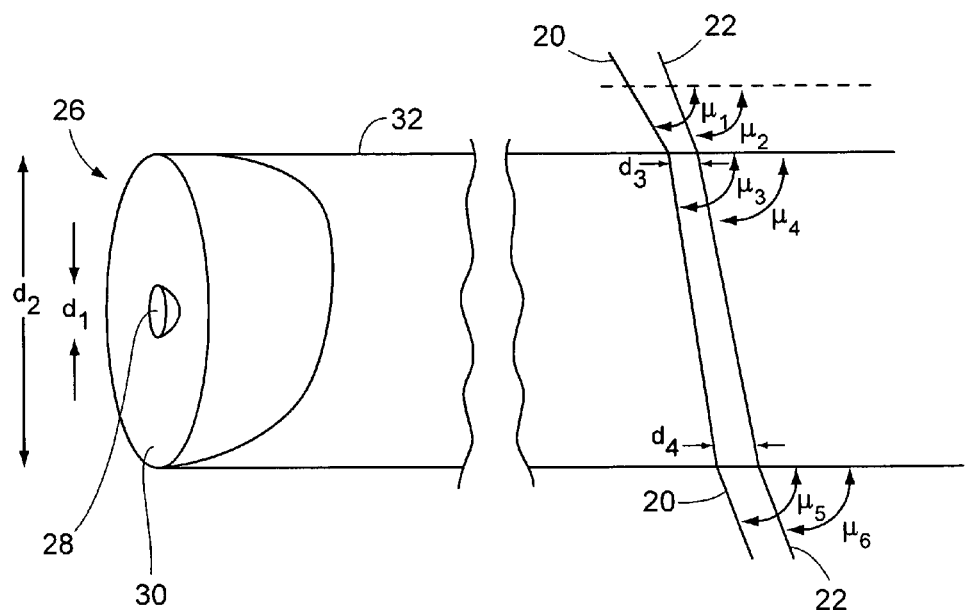
FIG. 4 illustrates a volume of air that is heated in accordance with the principles of the present invention.

With reference again to FIG. 1, and also to FIG. 4, region 26 is illustrated in which the air is heated to prevent the coalescence of two shock waves 20 and 22 in accordance with the principles of the present invention. More particularly, the region 26 (i.e., a volume of air, and, preferably, a spherical volume of air) is located at a distance from the vehicle 10 that allows the shockwave system to overrun it and includes two sub-regions 28 and 30. Sub-region 28 has a diameter "d1" on the order of 0.001" (one thousandth of an inch), is centered in the larger overall region 26, and is surrounded by the other sub-region 30 (which preferably has a diameter "d2" of about 1 meter). The region 26 is heated from onboard the vehicle 10 using directed energy devices (e.g. a laser and a microwave antenna array), and therefore moves with, the vehicle 10. Thus, as the vehicle 10 and region 26 move through the air, the region 26 is continuously forming heated air that moves backward relative to the vehicle 10.

To delay the coalescence of the shock wave system as it propagates toward the ground, the heated region 26 is created below and ahead of the aircraft 10 at a location that depends upon the configuration of the specific vehicle, its altitude, and Mach number. Of course, the heated region 26 could be created to either side of the aircraft or even above the aircraft if it is desired to delay or prevent coalescence as the shockwave system propagates in these directions. Generally, however, the heated region 26 will be closer to the aircraft 10 than the "point of shock coalescence" so that the heated air runs into the leading shocks 20 and 22 (i.e. as the shock waves move forward they encounter the relatively stationary heated region created in front of the shock waves). The increased air temperature in the heated region 26 causes the sections of the leading shock wave 20 to move forward thereby temporarily preventing the shock wave 20 from bending aft (along these sections) and coalescing with the shock waves 22A, 22B, and 22C that are downstream of it. The air temperatures that studies have shown to be desirable for this purpose are on the order of 10's to 100's of Kelvins above the ambient temperature.

In an embodiment, the heating (i.e. the laser and microwave energy) of the region is pulsed, in part, to reduce the average power used for noise suppression. If the pulses are separated sufficiently in time, of course, each pulse would create a separate and distinct heated region. However, by choosing the periods and durations of the heating pulses (assuming that the pulses are periodic although they need not be periodic) these separate regions can be caused to merge together within the time that it takes for the leading shock wave to overrun any of the separate heated regions. Optimization (minimizing the temperature rise and therefore the power used for noise suppression) is anticipated to be possible via study or modeling of the far field overpressure changes due to unsteady (time changing) shock locations.

Generally, the heated region 26 is anticipated to be about 1 to about 2 aircraft body lengths from the aircraft (i.e., in the "near field" of the aircraft). For a 100 foot long vehicle, as used in some of our studies, an initial distance of 150 feet has been selected. Analysis has indicated that this location will be effective.

The effect that the heated region has with respect to noise suppression and sonic boom control is illustrated in FIG. 4. As shown, the shockwaves 20, 22A, 22, B, and 22C propagate down and out from the vehicle 10 (see FIG. 1) at two slightly different angles "u1" and "u2" with respect to the vehicle's direction of motion. Note that the difference in these angles "u1" and "u2" is greatly exaggerated in FIG. 4. In reality both angles "u1" and "u2" will be quite close to the Mach Angle associated with the vehicle's supersonic speed. Also a distance "$d_3$" between the two shock waves 20, 22A, 22, B, and 22C is shown. Thus, the leading shock wave, here shock wave 20, will enter the heated mass of air 32 slightly before the trailing shock waves 22A, 22B, and 22C. In FIG. 4, the region 26 and sub-regions 28 and 30 are shown in cross section to illustrate a preferred three-dimensional nature of these regions. As the leading shock wave 20 enters the heated mass of air 32, it speeds up due to the higher local velocity of sound in the heated mass of air 32. Note that the Mach Angle "u1" of the shock wave 20 undergoes a corresponding increase to "u3". Shortly thereafter, the trailing shock waves 22A, 22B, and 22C enter the heated mass of air 32, speed up, and undergo an increase from Mach Angle "u2" to "u4". As a result, at the location where the shock waves 20 and 22 propagate to the far side of the heated mass of air 32, the shock waves 20 and 22 have been drawn farther apart than they were when they entered the heated mass of air. The increased separation between the shock waves 20, 22A, 22B, and 22C is represented by distance "$d_4$". Thus, the coalescence of the two shock waves 20 and 22 has been delayed and, preferably, delayed by an amount sufficient to prevent their coalescence before the shock waves 20, 22A, 22B, and 22C reach the ground. Instead of a sonic boom that is characterized by the "N Wave" shown in FIG. 2, an observer on the ground therefore experiences a series of less intense sounds as each separate shock wave 20 and 22 reaches the ground. Note that the last shock wave 25 (which is shown as being coalesced in FIG. 1) could be similarly treated to lessen the noise of the trailing edge of the disturbance as it traverses the ground. Accordingly, the observer is less likely to be startled by the sound propagating from the vehicle 10 and therefore more tolerant of its over flight. This increased tolerance will, therefore, enable a relaxation of over flight restrictions for vehicles that are constructed in accordance with the principles of the present invention.

Figure 5:
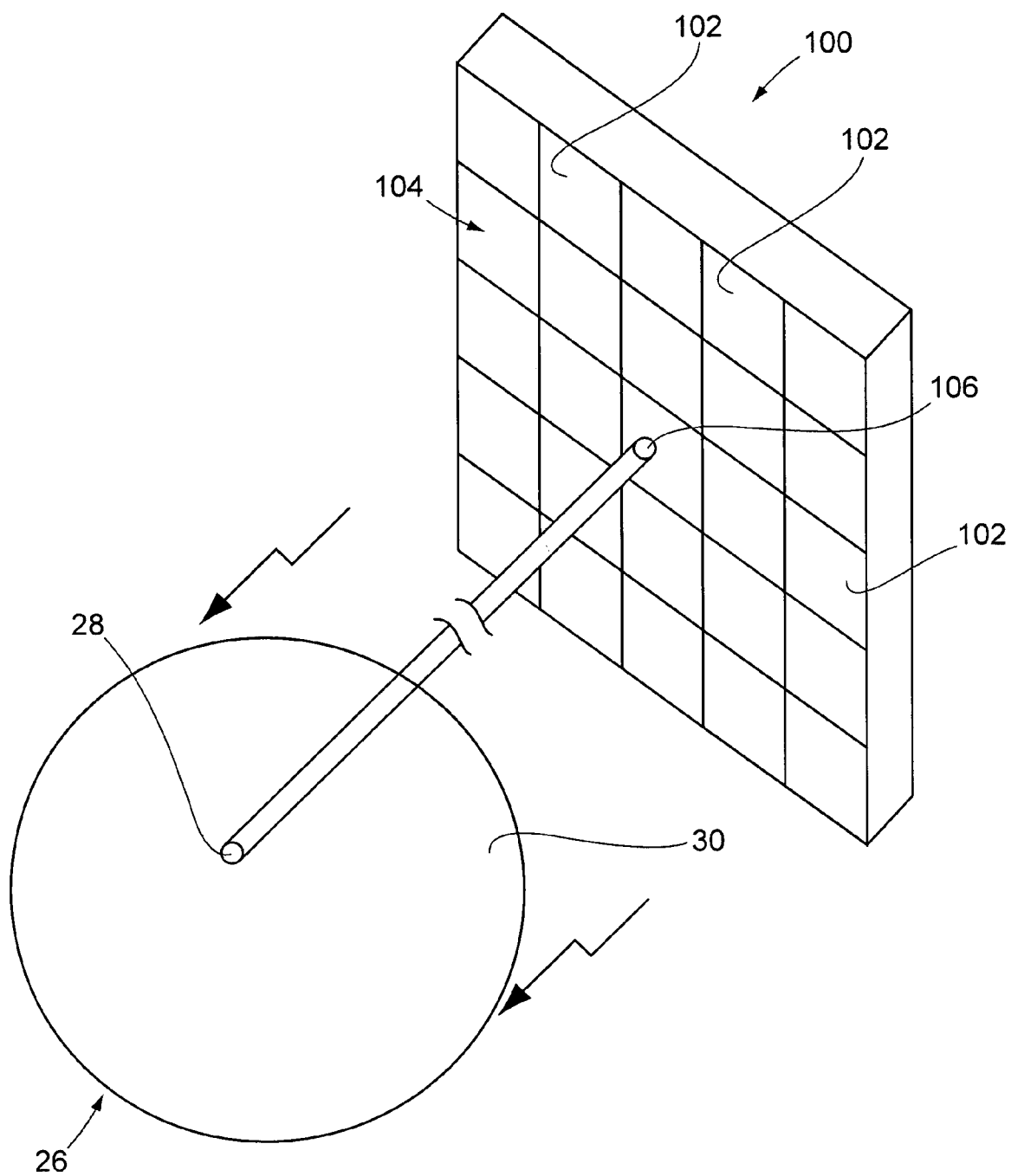
FIG. 5 illustrates a microwave antenna and laser constructed in accordance with the principles of the present invention.

Turning now to FIG. 5, an embodiment of an apparatus for heating the region 26 is illustrated schematically. The directed energy transmitter 100 includes an array 102 of microwave radiating elements (i.e. antennas) 104 and includes a laser 106. Preferably, the directed energy transmitter 100 is shaped to conform to the fuselage of a supersonic vehicle such as the vehicle 10 of FIG. 1 and, more particularly, to conform to the lower front portion of the bow 12 of the vehicle 10. In the alternative, a radome can cover and protect the directed energy transmitter 100. If a radome is used, it can be made of a material that is transparent to the laser or an aperture can be provided for the laser 106 or to allow the light emitted by the laser 106 to pass through the radome. Thus, the directed energy transmitter 100 can be positioned on the vehicle 10 to direct energy at the region 26. Preferably, the laser 106 is centered in the antenna array 102, although it need not be centered relative to the array 102.

Preferably, the antenna array 102 can be steered by varying the phase and amplitude of the individual signals being transmitted from the individual antennas 104. U.S. Pat. No. 5,471,220, entitled Integrated Adaptive Array Antenna, and issued to Hammers et al., describes steerable antenna arrays and is incorporated herein as if set forth in full. Likewise, steerable lasers 106 are known and allow the laser energy being transmitted from the laser 106 to be directed at a given point or region (e.g., sub-region 28 of FIG. 1). U.S. patent application Ser. No. 10/350,544, entitled Method And Apparatus For Controlling A Fiber Optic Phased Array Utilizing Frequency Shifting, by Rice et al., describes steerable lasers and is incorporated herein as if set forth in full.

Figure 6:
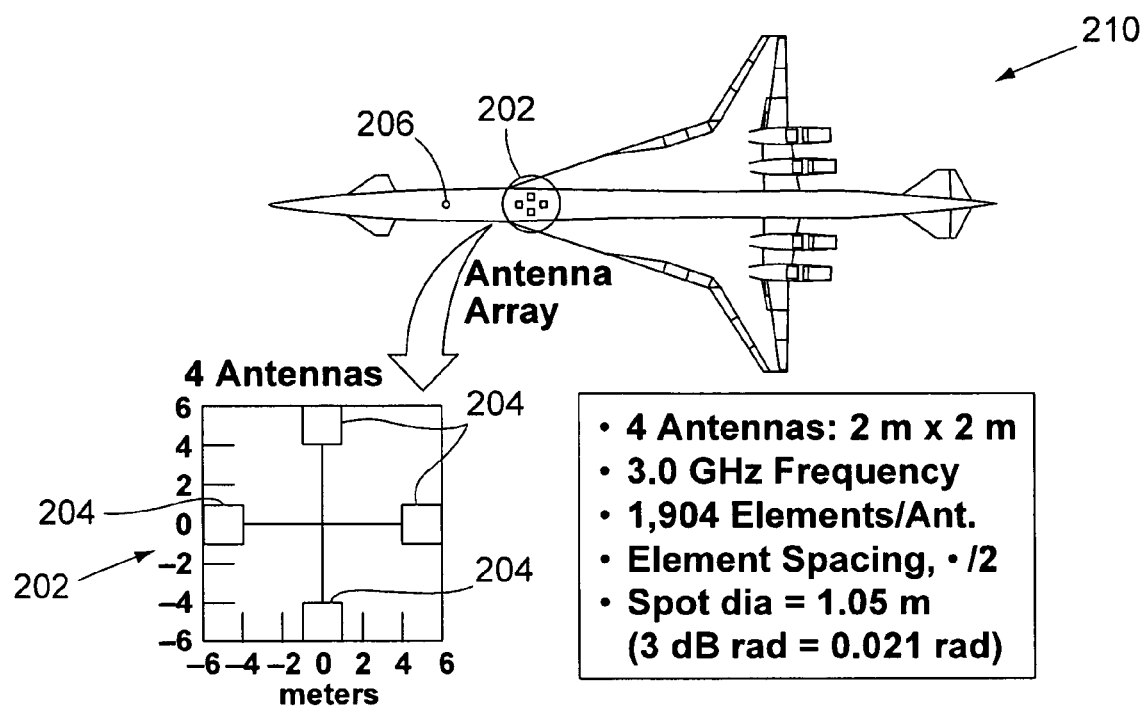
FIG. 6 illustrates another preferred embodiment of a microwave antenna and laser constructed in accordance with the principles of the present invention.
Figure 7:
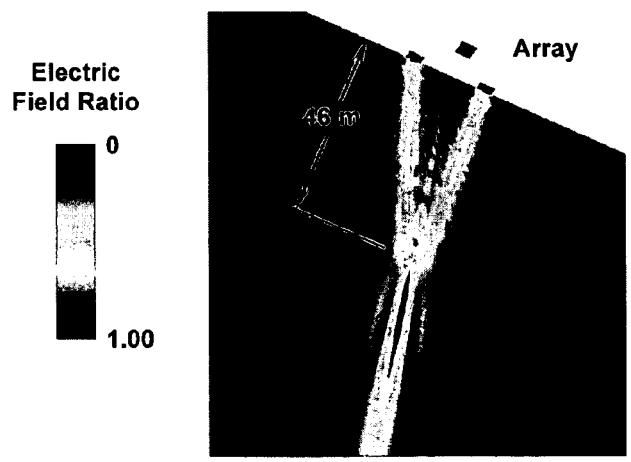
FIG. 7 illustrates the electric field propagation from the microwave antenna of FIG. 6.
Figure 8A:
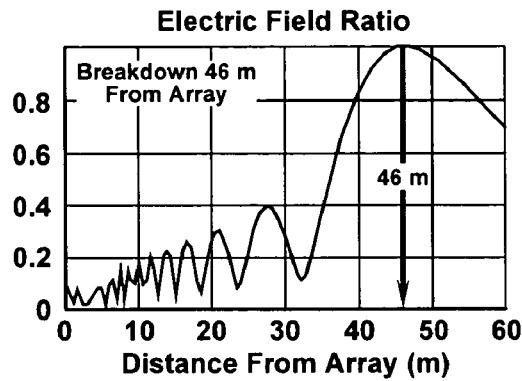
FIG. 8 illustrates representative results of a preferred embodiment of the present invention.
Figure 8B:
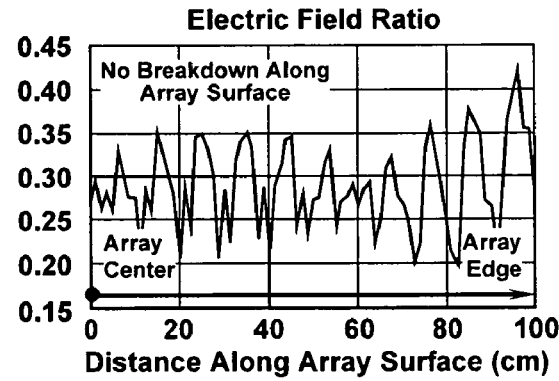
Figure 8C:
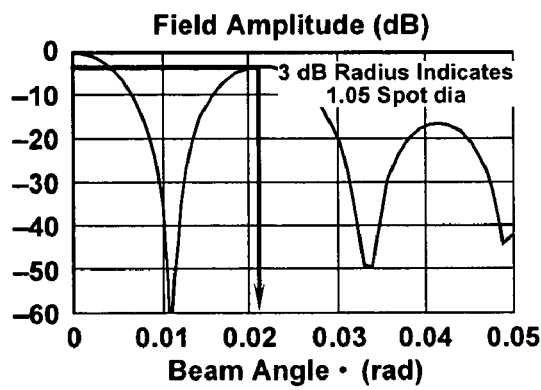
Figure 8D:
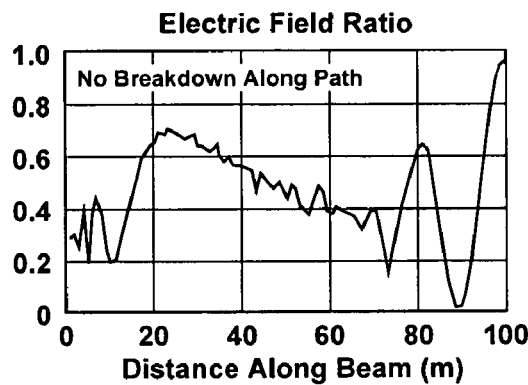
Figure 8E:
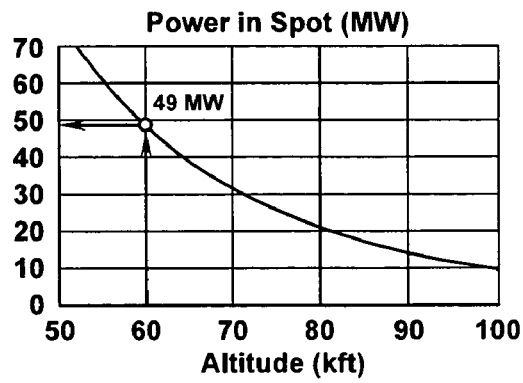

With regard to FIG. 6, another preferred embodiment of an apparatus for heating the region 26 is shown. The apparatus also includes an array 202 of microwave antennas 204 and a laser 206. In the current embodiment, the antenna array 204 and the laser 206 are separate components both of which are positioned on the underside of the aircraft 210. More particularly, the antenna array 202 and laser 206 (are located where the internal layout of the aircraft 210 provides volume (and other resources, for example electricity) such that the array 202 and laser 206 can focus forward and downward from the aircraft 206 to the desired location for the heated region 26. Of course, a window (preferably made of quartz) can be provided through the skin of the aircraft 10 such that the laser can be housed inside the aircraft 210 and still direct laser energy to the heated region 26. In the embodiment shown in FIG. 6, the antenna array 202 includes 4 antennas with each being about 2 meters by about 2 meters in size and operating at about 3.0 GHz. In this embodiment, the antennas 204 each include about 1,904 elements with element spacing of about ½ the operating wavelength as illustrated by FIG. 6. Also, in this embodiment, the array 202 is configured to produce a spot diameter of about 1.05 meters. FIG. 7 shows the predicted levels, of microwave energy that we expect such a system to deliver to the heated region 26. Similarly, FIGS. 8A-8E show the expected performance of the microwave antenna array 202 of the current embodiment.

In operation, a vehicle such as the vehicle 10 of FIG. 1, and incorporating a directed energy transmitter such as the directed energy transmitter 100 of FIG. 5, is flown at greater than Mach 1. Preferably, the laser 106 is turned on and steered (or otherwise) aimed at the sub-region 28. The location of the region is predetermined based on the configuration of the vehicle 10, the anticipated cruising speed of the vehicle 10, the anticipated cruising altitude, and the ambient temperature at the cruising altitude. In the alternative, the location of the sub-region 28 can be determined from real-time conditions and adjusted accordingly. Once the laser 106 is on, and transmitting laser energy to the sub-region 28, the laser energy breaks down the air in the sub-region 28. In the sub-region 28, an increasing number of the individual air molecules break down and become ions thereby releasing electrons into the sub-region 28. Preferably, the laser 106 has sufficient output to produce free electron densities on the order of $10^{11}$ per cubic centimeter or greater within microseconds of being exposed to the laser energy. The electrons in region 28 readily absorb the microwave energy being transmitted from the antenna array 102. Essentially then, the entire quantity of microwave power is coupled into the ionized air in the overall sub-region 26 with an efficiency near exceeding 30%.

In addition to the effect of the ionized air, a shock wave also develops as a result of the rapid heating of the region 28. This shockwave, which expands spherically from the region 28, also interacts with the shockwaves propagating from the aircraft. This interaction also serves to prevent the aircraft shockwaves from coalescing. Of course, the interaction is dependent on the strength of the shockwave generated by the rapid heating. It is anticipated that the majority of the effect on the aircraft shockwaves will be caused by the heated air rather than the shockwave formed by the heating.

In view of the foregoing, it will be seen that the several advantages of the invention are achieved and attained. The laser, which is preferred for creating a small "spark" of ionized air and electrons, can be much smaller than would be the case if the laser were relied on to ionize the entire mass of air that is used to control the noise of the vehicle. Further, the absorption of the microwave energy is much more efficient than the absorption of laser energy. Thus, the bulk of the energy is coupled into the air quite efficiently thereby saving energy, system weight, and system size compared to systems employing previous approaches. In short, the laser is employed to do what it does well in this context: heat and ionize a small amount of air. Likewise, the microwave antenna array is employed to do what it does well in this context: deliver a large quantity of energy to a large mass of air.

Also, the reduction of sonic boom effects in accordance with the principles of the present invention makes possible overland operations of high supersonic aircraft. Further, by allowing vehicle designs that are not constrained by the need to suppress the formation of shock waves (via shaping and packaging of the vehicle structure), the present invention provides increased vehicle operating range, improved fuel mileage, and reduced vehicle fabrication and support costs. Moreover, the present invention also enables improvements in the design of vehicle lifting systems (wings) and propulsion systems (inlets) because of the provided ability to alter flow direction, Mach Number, air pressure, air temperature, and air density of the flow field ahead of or around the vehicle. The apparatus and methods provided herein can also be used as a defense system to deflect incoming missiles or warheads by altering the properties of the air in the path of these weapons. This application of the present invention would be of particular use in terminal defense of high value targets. High power systems like the ones in this invention would also benefit the development of directed energy devices (e.g. lasers and microwave devices) by underwriting the cost of their development by amortizing the costs over a large number of commercial aircraft.

The embodiments were chosen and described in order to explain the principles of the invention and its practical application to thereby enable others skilled in the art to make and use the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the laser and the microwave transmission may be pulsed, or periodic, at a rate of about 10,000 Hz thereby further reducing the power demanded from the aircraft. Thus, the breadth and scope of the present invention should not be limited by any of the exemplary embodiments, but should be defined in accordance with the claims and their equivalents.

What is claimed is:

1. A method of reducing noise generated by a shockwave created from an airborne mobile platform travelling at a supersonic speed above the Earth's surface, the mobile platform having a length, and the method comprising:

directing laser electromagnetic radiation in a direction forwardly of the mobile platform and offset from a longitudinal centerline of the mobile platform, and to a predetermined location at least about one mobile platform length forwardly and offset from the longitudinal centerline of the mobile platform, the laser electromagnetic radiation being to a first volume of a gas whereby the laser electromagnetic radiation causes the first volume of the gas to become ionized;

directing microwave electromagnetic radiation in the same direction as the laser electromagnetic radiation and to the predetermined location, to a second volume of the gas, where the second volume of gas forms a sphere that envelopes the first volume of gas and is larger than the first volume of gas by a factor of at least about 1000, the microwave electromagnetic radiation causing the second volume of the gas to become ionized and heated; and the second volume of the gas being located such that the second volume of the gas is overrun by a shockwave generated forwardly of the moving mobile platform, relative to its direction of travel, and such that coalescing of components of the shockwave in a far field area at least about ten mobile platform lengths from the mobile platform is inhibited, to weaken the shockwave produced at the Earth's surface.

2. The method of claim 1, further comprising allowing the second volume of the gas to be overrun by the shockwave system in the gas.

3. The method of claim 1, wherein the gas comprises air, and wherein the directing of the laser electromagnetic radiation and the directing of the microwave electromagnetic radiation is from the mobile platform.

4. The method of claim 1, further comprising pulsing the laser electromagnetic radiation and pulsing the microwave electromagnetic radiation.

5. The method of claim 1, further comprising flying over land while directing the laser electromagnetic radiation and directing the microwave electromagnetic radiation.

6. The method of claim 1, further comprising steering the laser electromagnetic radiation and steering the microwave electromagnetic radiation.

7. The method of claim 1, wherein the shockwave is a first shockwave, the method further comprising allowing the second volume of gas to be overrun by the first shockwave and a second shockwave.

8. The method of claim 1, further comprising allowing the second volume of gas to be overrun by subsequent shockwaves.

9. The method of claim 1, wherein the second volume is arranged generally coaxial with the first volume.

* * * * *

UNITED STATES PATENT AND TRADEMARK OFFICE
CERTIFICATE OF CORRECTION

PATENT NO.       : 7,641,153 B2
APPLICATION NO.  : 11/284337
DATED            : January 5, 2010
INVENTOR(S)      : Philip Smereczniak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 661 days.

Signed and Sealed this

Sixteenth Day of November, 2010

David J. Kappos
*Director of the United States Patent and Trademark Office*